United States Patent Office 3,351,651
Patented Nov. 7, 1967

3,351,651
PROCESS FOR PREPARING 2,6-DICHLORO-
BENZONITRILE
Leonard A. Rothman, Brooklyn, N.Y., assignor to E. I. du Pont de Nemours and Company, Wilmington, Del., a corporation of Delaware
No Drawing. Filed May 5, 1964, Ser. No. 365,190
4 Claims. (Cl. 260—465)

This invention relates to a process for preparing 2,6-dichlorobenzonitrile, particularly from mixtures of 1,2-dichloro-4-nitrobenzene and 1,2-dichloro-3-nitrobenzene which usually have been discarded as useless materials.

It is known that 2,6-dichlorobenzonitrile has excellent herbicidal properties whereby it is particularly valuable as a herbicidal agent and is also useful as an intermediate for the preparation of other valuable compounds. However, it has been a rather expensive substance since it has been difficult and costly to manufacture it in reasonably pure form, requiring substantially pure starting materials and/or intermediates.

A number of such methods for preparing 2,6-dichlorobenzonitrile are disclosed by H. Koopman in Rec. Trav. Chim., 80, 1075–1083 (1961) and by "Shell" Research Limited in Belgian Patent 593,212 granted Jan. 20, 1961. More particularly, Koopman and the Belgian patent disclose that it is well known that the various halonitrobenzenes, including 2,3-dichloronitrobenzene (1,2-dichloro-3-nitrobenzene) specifically, can be converted to benzonitriles, e.g. 2-chloro-6-nitrobenzonitrile, by treatment with cuprous cyanide at 160–250° C. in the presence of a nitrogenous compound such as pyridine. The Belgian patent further discloses that, when an ortho-dihalo-compound such as 2,3-dichloronitrobenzene is so treated in the absence of a solvent, dark colored by-products are often formed which are probably phthalocyanins. To overcome this obstacle, it carries out the reaction in a reaction medium consisting of the dialkylamide of a fatty acid or a dialkylsulfoxide, generally at a lower temperature, between 125° C. and 200° C. They treat individual pure halonitrobenzenes and do not contemplate the treatment of mixtures of halonitrobenzenes such as the mixtures of this invention. They also disclose processes for isolating and purifying the halonitrobenzonitriles.

They further disclose that the individual purified halonitrobenzonitriles, e.g. 2-chloro-6-nitrobenzonitrile, can be transformed into dihalobenzonitriles, e.g. 2,6-dichlorobenzonitrile, by treating them in liquid or gas phase with chlorine or with thionyl chloride at a temperature of 180–300° C.

1,2-dichloro-3-nitrobenzene of the required purity for use in such process is difficult and costly to produce. This, combined with the necessity for isolating and purifying the 2-chloro-6-nitrobenzonitrile, render the latter compound expensive and contribute greatly to the cost of making the final desired 2,6-dichlorobenzonitrile.

In the mononitration of o-dichlorobenzene, the main product is 1,2-dichloro-4-nitrobenzene mixed with minor amounts (about 10–15%) of 1,2-dichloro-3-nitrobenzene, each of which is a well-known and valuable product. Separation of these isomers by distillation is not possible due to their close boiling points, the 3-isomer boiling at 257° C.–258° C., and the 4-isomer at 225° C.–256° C. Isomer separation by fractional crystallization has been proposed, but also is not entirely satisfactory. To a certain extent, separation can be achieved by a process known as "sweating," which is crystallization by slow cooling, and such process is frequently employed commercially. As a result of this procedure, the residual drainings, consisting of a eutectic mixture amounting to about 33% of the original product of nitration and incapable of further separation, are customarily discarded as waste. This represents a high percentage of the products and a considerable loss of valuable materials. Therefore, it is of economic importance to minimize or eliminate this loss.

"Shell" Research Ltd., in French Patent 1,326,419 of Apr. 1, 1963, discloses that mixtures of 2,3-dichloronitrobenzene (1,2-dichloro-3-nitrobenzene) and 3,4-dichloronitrobenzene (1,2-dichloro-4-nitrobenzene) can be treated with copper cyanide in the presence of various diluents (solvents), at 120° C. to 250° C. to transform the 2,3-dichloronitrobenzene to 2-chloro-6-nitrobenzonitrile while the 3,4-dichloronitrobenzene remains unchanged, and that there can be recovered from the reaction mixture by distillation and extraction a material composed principally of 2-chloro-6-nitrobenzonitrile. This French patent does not disclose or suggest chlorination of the product.

British Patent 938,199, Shell International Research, published Oct. 2, 1963, describes a process for separating a nitrile from an aqueous mixture of the nitrile and an inorganic metal salt. The process is directed to halogenated benzonitriles, and especially to the separation of 2-chloro-6-nitrobenzonitrile from cuprous chloride. The statement is made, "According to the new process, it is now possible to isolate the compounds referred to in a very pure state, which is in many cases an essential requirement for their application. This is in particular the case when a compound like 6-chloro-2-nitrobenzonitrile [ed: C.A. uses 2-chloro-6-nitro-] is reacted with halogen or a thionyl halide according to the method described in B.P. Spec. No. 861,899."

It is well known to the art that the presence of copper during chlorination of aromatic compounds catalyzes ring chlorination, i.e. the substitution of chlorine for hydrogen on the benzene ring. The following references show chlorination of the ring in the presence of copper: J. Organic Chemistry 26, 2267 (1961); J. Chem. Soc. Japan 51, 541–51 (1930); and Mem. Coll. Sci. Kyoto Imp. Univ. 10A, 325–30 (1927). Therefore, it can be concluded that the reason that those skilled in the art used care to remove copper salts from the 2-chloro-6-nitrobenzonitrile before attempting to chlorinate it was to prevent the introduction of chlorine into the ring in the subsequent chlorination of the nitrile, in which it was desired to replace only the nitro group by chlorine.

It is an object of this invention to provide a process for obtaining 2,6-dichlorobenzonitrile from mixtures of 1,2-dichloro-4-nitrobenzene and 1,2-dichloro-3-nitrobenzene which formerly were discarded. A particular object is to provide a process for producing 2,6-dichlorobenzonitrile in a more economically advantageous manner from inexpensive materials. Other objects are to advance the art. Still other objects will appear hereinafter.

The foregoing and other objects may be accomplished by the process for preparing 2,6-dichlorobenzonitrile according to this invention, which process comprises (a) heating at a temperature in the range of from about 155° C. to about 210° C. in the absence of a solvent, (b) a mixture which consists essentially of about 65% to about 90% by weight of 1,2-dichloro-4-nitrobenzene and about 35% to about 10% by weight of 1,2-dichloro-3-nitrobenzene (c) with 1 to about 2 moles of cuprous cyanide per mole of 1,2-dichloro-3-nitrobenzene (d) in the presence of about 0.02 to about 0.2 mole of a catalyst per mole of 1,2-dichloro-3-nitrobenzene, said catalyst consisting of at least 1 member of the group consisting of pyridine, lutidine and quinoline;

(e) then passing elemental chlorine through the reaction mixture at a temperature in the range of about 155° C. to about 205° C. until chlorination is complete;

(f) and then separating from the reaction mass 2,6-dichlorobenzonitrile and 1,2,4-trichlorobenzene.

It has now been found that, contrary to the teachings of the prior art, chlorine may be passed directly into the reaction mass resulting from the treatment of 1,2-dichloro-3-nitrobenzene or a mixture thereof with 1,2-dichloro-4-nitrobenzene with cuprous cyanide. It is altogether surprising and unexpected that the nitro group can be easily replaced by chlorine in the presence of copper without chlorination of the ring or other undesirable side reactions. A considerable economic saving and technical advantage is thus achieved by cyanation and subsequent chlorination of the cyanation reaction mixture without isolation of the intermediate. Any loss of the intermediate, 2-chloro-6-nitrobenzonitrile, which was encountered by the previously employed separation and purification steps thereof can now be averted. In addition, the presence of the 1,2-dichloro-4-nitrobenzene isomer is advantageous in that it is converted into 1,2,4-trichlorobenzene, which serves as a solvent for the desired product, 2,6-dichlorobenzonitrile. This is especially desirable, since the product has such a high melting point (142–144° C.) that the addition of a solvent would have been necessary in the separation of the 2,6-dichlorobenzonitrile from the reaction mixture.

This chlorination of the reaction mixture is particularly advantageous where it is desired to produce 2,6-dichlorobenzonitrile in the highest yields and in the most economical manner. It is far more economical than producing the 2,6-dichlorobenzonitrile from pure or substantially pure starting materials such as 1,2-dichloro-3-nitrobenzene and 2-chloro-6-nitrobenzonitrile. The copper salts and other ingredients of the reaction mixture do not interfere with the chlorination reaction. The 1,2,4-trichlorobenzene acts as a solvent for the crystallization of the 2,6-dichlorobenzonitrile. Also, the 1,2,4-trichlorobenzene is a well-known compound which is of value as a solvent and for many other purposes known to the art.

The mixtures of dichloronitrobenzenes which are to be treated by the process of this invention consist essentially of about 65% to about 90% by weight of 1,2-dichloro-4-nitrobenzene and about 35% to about 10% by weight of 1,2-dichloro-3-nitrobenzene. Usually, the mixtures are those obtained by the mononitration of o-dichlorobenzene followed by separation of most of the 1,2-dichloro-4-nitrobenzene by crystallization under slow cooling. However, this invention is not limited to the source of the mixtures or to the method by which they are produced. These mixtures cannot be separated into their components practically and economically by prior known methods.

The treatment of the mixtures of dichloronitrobenzenes with cuprous cyanide by the process of this invention is conducted in the absence of a solvent. Unexpectedly, in view of the teachings of the prior art, dark colored by-products usually are not formed under the conditions of this invention. In some cases, a very slight darkening of the product does occur, which color readily can be removed by treatment of the product with charcoal.

It has been found that only cuprous cyanide, CuCN (sometimes written as $Cu_2(CN)_2$), is suitable in the process of this invention. The amount of cuprous cyanide employed should be at least 1 mole per mole of 1,2-dichloro-3-nitrobenzene (a stoichiometric amount) and, conveniently may be up to about 2 moles, preferably from about 1.1 to about 1.4 moles of cuprous cyanide. While a large excess of cuprous cyanide, more than 2 moles, is operable and does not cause cyanation of the 1,2-dichloro-4-nitrobenzene, no advantage is gained thereby but will result in uneconomical waste of cuprous cyanide.

The cyanation reaction is conducted in the presence of a basic catalyst which consists of at least one cyclic nitrogen-containing compound of the group consisting of pyridine, lutidine and quinoline, preferably pyridine or quinoline. The catalyst will be employed in a proportion of about 0.02 to about 0.2 mole per mole of 1,2-dichloro-3-nitrobenzene.

The cyanation reaction should be carried out at a temperature in the range of from about 155° C. to about 210° C., preferably, about 165° C. to about 210° C. Below about 155° C., the reaction becomes impractically slow. It is not necessary to go above 210° C., since the reaction proceeds well at temperatures in the range specified. In addition, intense heating of nitro compounds is not recommended. The reaction time may vary between one and about 12 hours, depending upon the reaction temperature.

The process of this invention is simply and readily operated. Usually, the mixture of dichloronitrobenzenes, consisting essentially of about 65% to about 90% by weight of 1,2-dichloro-4-nitrobenzene and about 35% to about 10% by weight of 1,2-dichloro-3-nitrobenzene, is heated to the desired reaction temperature, cuprous cyanide and the catalyst are added to the mixture, and the reaction mixture is maintained at the reaction temperature, usually with stirring, until the cyanation reaction is complete.

The chlorination is conducted in the presence of the copper salts since they do not deleteriously affect the chlorination. The chlorination ordinarily is conducted by passing elemental chlorine through the cyanation reaction mixture at a temperature in the range of from about 155° C. to about 205° C., preferably from about 190° C. to about 205° C., until the chlorination is complete, i.e. until the red color of evolved nitrogen oxides disappears. Ordinarily, from about 2 to about 4 moles of chlorine will be used per mole of 2-chloro-6-nitrobenzonitrile present, more than 4 moles of chlorine being wasteful. The exact amount of chlorine used will be determined by the reaction conditions, such as the rate of flow of chlorine gas, the temperature, agitation, etc. The time required for completion of the chlorination will range from about 5 to about 12 hours, usually and preferably about 6 to about 8 hours.

After the chlorination is completed, the reaction mass is cooled to about 150° C., filtered to remove insolubles, and the filtrate further cooled to about 5° C. to precipitate the 2,6-dichlorobenzonitrile which can be separated by filtration. The filtrate comprises mainly 1,2,4-trichlorobenzene which can be recovered by distillation.

In order to more clearly illustrate this invention, preferred modes of practicing it, and advantageous results to be obtained thereby, the following examples are given in which the parts and proportions are by weight except where specifically indicated otherwise.

*Example 1*

To a mixture of 340 g. of 1,2-dichloro-4-nitrobenzene and 60 g. of 1,2-dichloro-3-nitrobenzene, 28 g. of cuprous cyanide and 4 ml. of quinoline are added. The mixture is heated to 205° C.–210° C. and held at this temperature for 4 hours, with stirring. At the end of this time, the mixture is cooled to 190° C., and chlorine is passed in for 24 hours. At the end of this time, vapor phase chromatography indicates that the mixture contains

|  | Percent |
|---|---|
| 1,2,4-trichlorobenzene | 73.3 |
| 1,2,3-trichlorobenzene | 3.1 |
| 2,6-dichlorobenzonitrile | 16.3 |
| 1,2,4,5-tetrachlorobenzene | 2.8 |
| 6-chloro-2-nitrobenzonitrile | 0.3 |
| Miscellaneous unknowns | 4.2 |

The mixture is cooled to 150° C. and filtered to remove copper salts. The press cake is washed with 50 g. of hot trichlorobenzene and the filtrates are then cooled to 10° C.

The precipitate is filtered off and washed with isopropyl alcohol and then with petroleum ether. There is obtained 26 g. of 2,6-dichlorobenzonitrile as white crystals.

Example 2

A 384 g. mixture, containing 32% of 1,2-dichloro-3-nitrobenzene and 66% of 1,2-dichloro-4-nitrobenzene, is heated to 185° C.–190° C. A mixture of 59.7 g. of cuprous cyanide and 6 ml. of pyridine is added over one hour at 180° C.–190° C. After the addition is completed, the mixture is held at 185° C.–190° C. for 8 hours with stirring. The mixture is then heated to 190° C.–195° C., and chlorine is passed in for 12 hours. At the end of this time, vapor phase chromatography reveals that the mixture contains

|  | Percent |
|---|---|
| 1,2,4-trichlorobenzene | 60.8 |
| 1,2,3-trichlorobenzene | 2.5 |
| 2,6-dichlorobenzonitrile | 28.3 |
| 1,2,4,5-tetrachlorobenzene | 1.7 |
| 6-chloro-2-nitrobenzonitrile | 0.9 |
| Miscellaneous unknowns | 5.8 |

The mixture is cooled to 150° C. and the copper salts removed by filtration. The salts are washed with 120 g. of hot trichlorobenzene. The filtrates are cooled to 5° C., and the precipitate is separated by filtration. The precipitate is washed with isopropyl alcohol, then with petroleum ether, and then dried at 50° C.–60° C. There is obtained 64 g. of 2,6-dichlorobenzonitrile, M.P. 143° C.–145° C.

Example 3

To 384 g. of a mixture containing 31% of 1,2-dichloro-3-nitrobenzene and 64% of 1,2-dichloro-4-nitrobenzene, 59.7 g. of cuprous cyanide and 8 ml. of quinoline are added. The mixture is heated to 185° C.–190° C. and held for 11 hours with stirring. At the end of this time, the temperature is raised to 190° C.–195° C., and chlorine is passed into the mixture for 12 hours. At the end of this time, vapor phase chromatography indicates that the mixture contains

|  | Percent |
|---|---|
| 1,2,4-trichlorobenzene | 59.4 |
| 1,2,3-trichlorobenzene | 2.5 |
| 2,6-dichlorobenzonitrile | 29.4 |
| 1,2,4,5-tetrachlorobenzene | 2.1 |
| 6-chloro-2-nitrobenzonitrile | 0.7 |
| Miscellaneous unknowns | 5.9 |

The mixture is cooled to 150° C., and filtered. The filtered copper salts are washed with 120 g. of trichlorobenzene at 125° C. The filtrates are cooled to 5° C., and the precipitate is separated by filtration. The precipitate is washed with isopropyl alcohol and then petroleum ether, and dried at 50° C.–60° C. There is obtained 73 g. of 2,6-dichlorobenzonitrile, M.P. 142° C.–144° C.

It will be understood that the foregoing examples are given for illustrative purposes solely, and that this invention is not limited to the specific embodiments described therein. On the other hand, it will be apparent to those skilled in the art that, subject to the limitations set forth in the general description, many variations and modifications can be made in the materials, proportions, conditions and techniques employed without departing from the spirit or scope of this invention.

From the foregoing description and examples, it will be apparent that this invention provides a novel process whereby valuable products can be obtained from a material which heretofore was discarded as substantially valueless. Particularly, it provides a process for obtaining 2,6-dichloro-benzonitrile at greatly reduced cost and in increased yields. The process is easy and economically practical to operate. Accordingly, it is apparent that this invention constitutes a valuable advance in and contribution to the art.

The embodiments of the invention in which an exclusive property or privilege is claimed are defined as follows:

1. The process for preparing 2,6-dichlorobenzonitrile which comprises
    (a) heating at a temperature in the range of from about 155° C. to about 210° C. in the absence of a solvent,
    (b) a mixture which consists essentially of about 65% to about 90% by weight of 1,2-dichloro-4-nitrobenzene and about 35% to about 10% by weight of 1,2-dichloro-3-nitrobenzene
    (c) with 1 to about 2 moles of cuprous cyanide per mole of 1,2-dichloro-3-nitrobenzene
    (d) in the presence of about 0.02 to about 0.2 mole of a catalyst per mole of 1,2-dichloro-3-nitrobenzene, said catalyst consisting of at least 1 member of the group consisting of pyridine, lutidine and quinoline, until cyanation is complete;
    (e) then passing elemental chlorine through the reaction mixture at a temperature in the range of about 155° C. to about 205° C. until chlorination is complete;
    (f) and then separating from the reaction mass 2,6-dichlorobenzonitrile and 1,2,4-trichlorobenzene.

2. The process for preparing 2,6-dichlorobenzonitrile which comprises
    (a) heating at a temperature in the range of from about 165° C. to about 210° C. in the absence of a solvent,
    (b) a mixture which consists essentially of about 65% to about 90% by weight of 1,2-dichloro-4-nitrobenzene and about 35% to about 10% by weight of 1,2-dichloro-3-nitrobenzene
    (c) with about 1.1 to about 1.4 moles of cuprous cyanide per mole of 1,2-dichloro-3-nitrobenzene
    (d) in the presence of about 0.02 to about 0.2 mole of a catalyst per mole of 1,2-dichloro-3-nitrobenzene, said catalyst consisting of at least 1 member of the group consisting of pyridine, lutidine and quinoline, until cyanation is complete;
    (e) then passing elemental chlorine through the reaction mixture at a temperature in the range of about 190° C. to about 205° C. until chlorination is complete;
    (f) and then separating from the reaction mass 2,6-dichlorobenzonitrile and 1,2,4-trichlorobenzene.

3. The process for preparing 2,6-dichlorobenzonitrile which comprises
    (a) heating at a temperature in the range of from about 165° C. to about 210° C. in the absence of a solvent,
    (b) a mixture which consists essentially of about 65% to about 90% by weight of 1,2-dichloro-4-nitrobenzene and about 35% to about 10% by weight of 1,2-dichloro-3-nitrobenzene
    (c) with about 1.1 to about 1.4 moles of cuprous cyanide per mole of 1,2-dichloro-3-nitrobenzene
    (d) in the presence of about 0.02 to about 0.2 mole of quinoline per mole of 1,2-dichloro-3-nitrobenzene, until cyanation is complete;
    (e) then passing elemental chlorine through the reaction mixture at a temperature in the range of about 155° C. to about 205° C. until chlorination is complete;
    (f) and then separating from the reaction mass 2,6-dichlorobenzonitrile and 1,2,4-trichlorobenzene.

4. The process for preparing 2,6-dichlorobenzonitrile which comprises
    (a) heating at a temperature in the range of from about 165° C. to about 210° C. in the absence of a solvent,
    (b) a mixture which consists essentially of about 65% to about 90% by weight of 1,2-dichloro-4-nitrobenzene and about 35% to about 10% by weight of 1,2-dichloro-3-nitrobenzene (c) with about 1.1 to about 1.4 moles of cuprous cyanide per mole of 1,2-dichloro-3-nitrobenzene
(d) in the presence of about 0.02 to about 0.2 mole of pyridine per mole of 1,2-dichloro-3-nitrobenzene, until cyanation is complete;
(e) then passing elemental chlorine through the reaction mixture at a temperature in the range of about 155° C. to about 205° C. until chlorination is complete;
(f) and then separating from the reaction mass 2,6-dichlorobenzonitrile and 1,2,4-trichlorobenzene.

References Cited

UNITED STATES PATENTS

| | | | |
|---|---|---|---|
| 3,144,476 | 8/1964 | Haken et al. | 260—465 |
| 3,179,691 | 4/1965 | Koopman et al. | 260—465 |

FOREIGN PATENTS

| | | |
|---|---|---|
| 884,166 | 12/1961 | Great Britain. |
| 1,326,419 | 4/1963 | France. |

CHARLES B. PARKER, Primary Examiner.

D. H. TORRENCE, Assistant Examiner.